(12) United States Patent
Kelaiditis

(10) Patent No.: US 8,192,138 B2
(45) Date of Patent: Jun. 5, 2012

(54) METHOD AND DEVICE FOR USING WIND ENERGY

(76) Inventor: Konstantin Kelaiditis, St. Ingbert (DE)

( * ) Notice: Subject to any disclaimer, the term of this patent is extended or adjusted under 35 U.S.C. 154(b) by 1106 days.

(21) Appl. No.: 11/886,396

(22) PCT Filed: Mar. 15, 2006

(86) PCT No.: PCT/DE2006/000475
§ 371 (c)(1),
(2), (4) Date: Jan. 25, 2008

(87) PCT Pub. No.: WO2006/097091
PCT Pub. Date: Sep. 21, 2006

(65) Prior Publication Data
US 2008/0112789 A1 May 15, 2008

(30) Foreign Application Priority Data

Mar. 15, 2005 (DE) .......................... 10 2005 012 180
Dec. 20, 2005 (DE) .......................... 10 2005 060 818

(51) Int. Cl.
*F03D 7/06* (2006.01)
(52) U.S. Cl. .......................................... 415/4.2; 415/909
(58) Field of Classification Search ................... 415/4.2, 415/4.4, 909
See application file for complete search history.

(56) References Cited

U.S. PATENT DOCUMENTS

| | | | |
|---|---|---|---|
| 381,679 A * | 4/1888 | Devereux | 415/4.4 |
| 4,178,124 A * | 12/1979 | Puskas | 415/4.5 |
| 4,406,579 A * | 9/1983 | Gilson | 415/2.1 |
| 5,380,149 A * | 1/1995 | Valsamidis | 415/2.1 |
| 6,666,650 B1 * | 12/2003 | Themel | 416/200 R |
| 2004/0265130 A1 | 12/2004 | Wieser | |

FOREIGN PATENT DOCUMENTS

| | | |
|---|---|---|
| DE | 199 57 141 | 5/2001 |
| GB | 2 304 381 | 3/1997 |
| WO | 03/052267 | 6/2003 |
| WO | 2004/109097 | 12/2004 |

* cited by examiner

*Primary Examiner* — Edward Look
*Assistant Examiner* — Dwayne J White
(74) *Attorney, Agent, or Firm* — Lucas & Mercanti, LLP; Klaus P. Stoffel

(57) ABSTRACT

According to the invention, to use wind energy, a flow is conducted effectively onto a rotor to convert the flow energy by means of a steering mechanism. According to the invention, the steering mechanism permits: the wind to be conducted from a point of higher wind speed to a point of lower wind speed that is preferred for the installation of the rotor; the flow cross-section to be narrowed and compressed, thus increasing the flow speed; one side of a rotor with an axis running transversally to the wind direction to be shielded; and/or a suction effect to be generated downstream of the rotor in the flow direction. The device comprises a hollow tower (2) with a wind trap opening (5) at the upper end and a flow channel that is formed by the hollow cross-section of the tower (2), said channel leading downwards to at least one rotor (12; 14) that is located in the vicinity of the ground for converting the flow energy. An outlet (13) for the air is situated downstream of the rotor. An upper end section (3) of the tower comprising the wind trap opening (5) can be rotated (4).

3 Claims, 11 Drawing Sheets

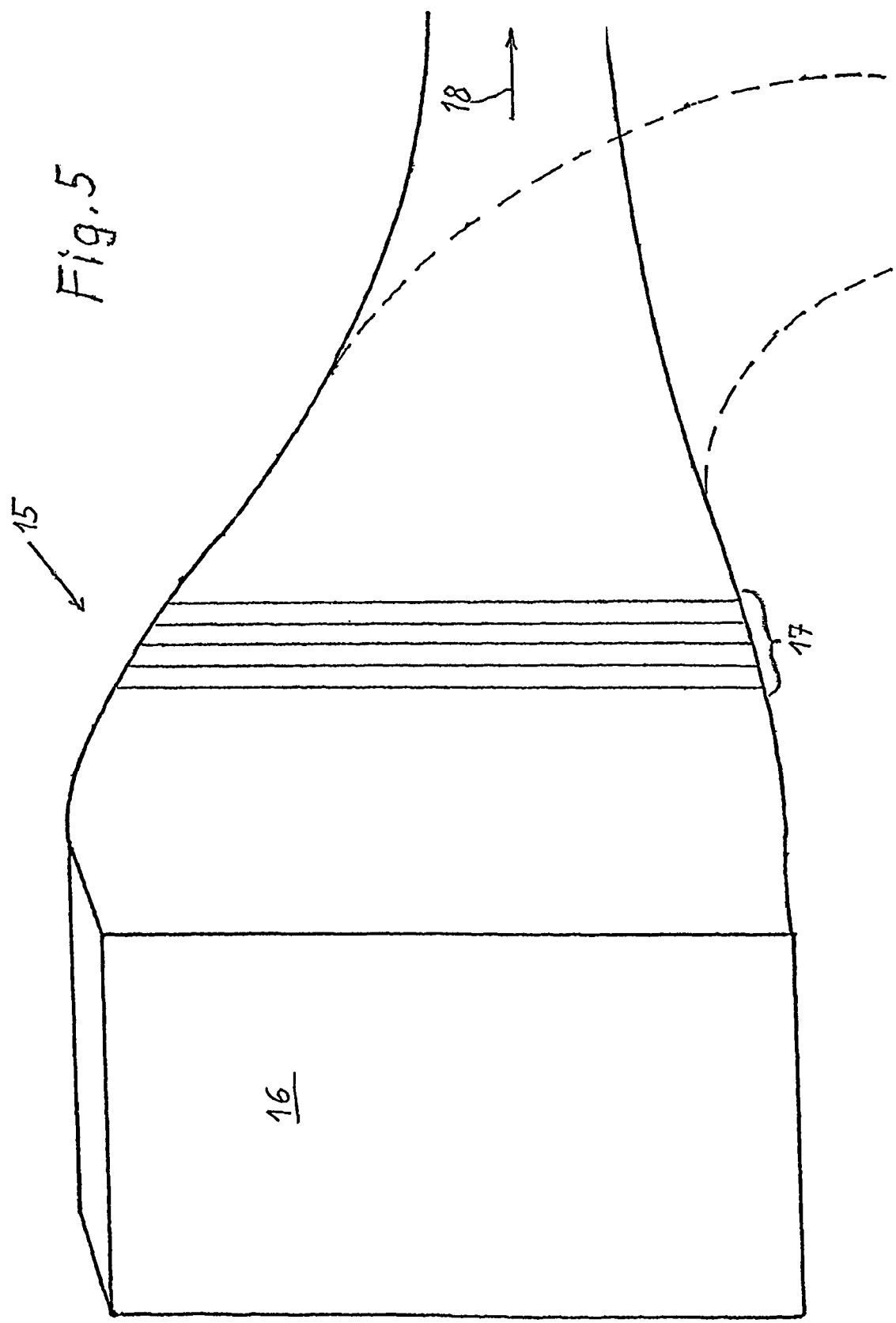

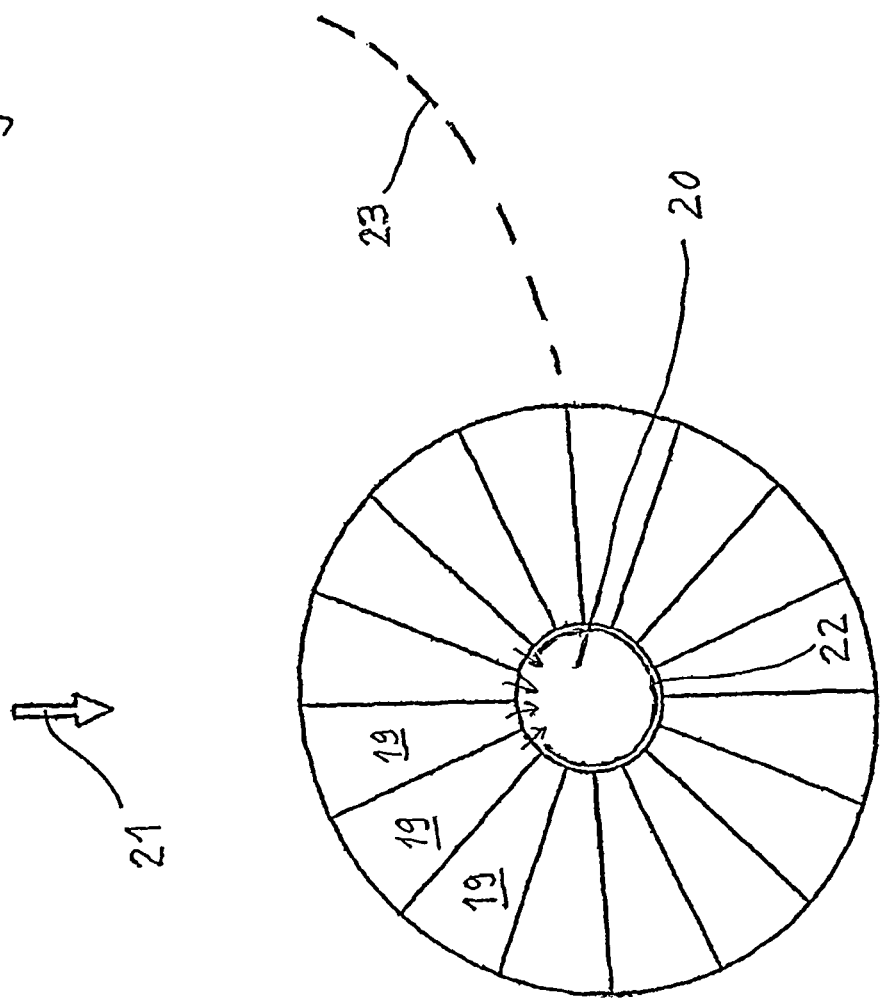
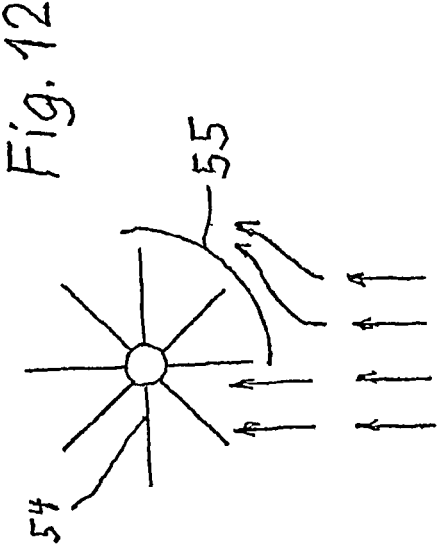

METHOD AND DEVICE FOR USING WIND ENERGY

BACKGROUND OF THE INVENTION

The invention pertains to a method and to a device for using wind energy.

SUMMARY OF THE INVENTION

The invention is based on the task of reducing the effort required to use wind energy based on the yield.

According to the invention, this task is accomplished in that, by directing the wind, the flow is effectively guided to a rotor for conversion of the flow energy.

There are many different possibilities for realizing the invention, and these possibilities can also be combined with each other, where the effective flow can be the wind itself, or it can be the diverted wind.

By directing the wind, it is possible
 (a) to guide the wind from a point of higher wind velocity to a point of lower wind velocity more suitable for the installation of the rotor;
 (b) to narrow the flow cross section, thus compressing the flow and increasing the flow velocity;
 (c) to shield one side of a rotor in cases where the axis is transverse to the direction of the wind; and/or
 (d) to generate a suction effect downstream from the rotor.

A device for implementing the method is characterized by at least one deflecting surface, which directs the wind in such a way that it can act on a rotor to convert the flow energy.

According to what was said above, there are many different means which can be used to implement the method. In particular, a light-weight structural approach with sheets, windsocks, or stretched-out sails mounted on frames can be used to realize the deflecting surfaces.

As a concrete embodiment, an alternative to a wind turbine is proposed, which is characterized by a hollow tower with a wind-capturing opening at the top and a flow channel formed in the hollow cross section of the tower, which leads downward to at least one rotor located near the ground to convert the flow energy, an outlet for the air being provided downstream of the rotor.

By arranging the rotor and the other pieces of equipment driven by the rotor on or at least near the ground, all of these devices can be simpler and cheaper and can be maintained more easily and more cheaply than the standard wind turbines, the bearings, gears, and generators of which are at a considerable height above the ground.

The tower can also be made of light-weight materials and thus at lower cost than in the case of wind turbines, because it can be braced by guy wires even at its greatest height. In contrast, wind turbines cannot be braced in the area where their vanes extend; that is, at least approximately the uppermost third of the tower cannot be braced; this section is simply left alone. In addition, the wind-capture opening of the tower can have a larger area than the total area of the vanes, which is limited by the tipping moment which develops. The possibility of bracing is especially advantageous for offshore use. For this application, towers, floating on pontoons, are especially suitable in any case because of their low center of gravity, which is much lower than that of wind turbines.

More complete use is made of the captured wind than in the case of wind turbines. The flow becomes more uniform over the length of the tower and drives the rotor more uniformly, whereas the actuating forces are often distributed nonuniformly over the vanes of a wind turbine.

The flow can be focused on rotors of smaller cross section, including the turbines.

Rotors with an axis aligned in the flow direction can be provided with a larger number of vanes.

It is also possible, however, to use rotors with an axis which is transverse to the flow direction. No more than half of such a rotor projects into the flow cross section, and its vanes are carried along directly by the flow. The cross section of the flow channel can also be changed, i.e., possibly converted from a round to a square form. Within limits, it can also be made smaller to increase the flow velocity and the air density, as already suggested above when reference was made to "focusing". Systems of this type can also be protected from lightning more easily than wind turbines. The environmental burden is reduced in comparison with wind turbines; very little noise is generated, and no moving shadows are cast. Several devices can be set up relatively close together; that is, the energy yield per unit occupied by the devices is larger.

As a rule, the top end of the tower with the wind capture opening will be rotatable, so that the position of the wind capture opening can be adapted to changes in the direction of the wind. As an alternative, several openings, which can be opened and closed, can be provided on different sides. According to another advantageous embodiment, the height of the tower can be adjusted by means of telescoping sections. When the wind is strong, the tower can be shortened to a greater or lesser extent to reduce the force which the wind exerts on it and thus to prevent damage. The normal height of the wind capture opening can be approximately on the same order of magnitude as the height of the axis of a wind turbine.

According to an advantageous elaboration of the invention, the flow channel has branches, and one of the previously mentioned energy conversion units is installed in each branch, where preferably at least some of the branches can be closed off.

Because of the division of the flow channel into closable branches, the device can be adapted to different wind velocities in that, at lower wind velocities, only some of the energy-conversion units are put into operation, but the forces which actuate them will remain more-or-less the same. The units can thus always operate close to their optimum levels. Under certain conditions, however, it can be effective to work with branches which cannot be closed individually.

The towers provided in place of wind turbines experience the higher wind velocities prevailing at higher elevations. The inventive principle, however, can also be realized in many other different ways. In locations with strong winds, e.g., in the mountains or on bridges, it is possible to install, for example, windsocks with openings near the ground. The opening can be set up in such a way that it slants backward in a strong wind and tips over completely if necessary. It is also possible to provide simple wind scoops, from which a flow channel leads.

Instead of windsocks or other flow channels of closed cross section, it is also possible to stretch out sail-like deflecting walls, even over considerable distances, which act on a rotor at the end.

This rotor could be a wind turbine of conventional design, although smaller, and it could also stand directly in the wind. Thus, as a result of the coming-together of two flows, that is, considered overall, ultimately by the narrowing of the flow cross section, a compression would occur at the wind turbine.

The measures of flow guidance and rotor design mentioned above in conjunction with the tower can also be applied to a great extent to the other embodiments mentioned above.

As an especially advantageous elaboration of the invention, however, a device with a rotor with an axis oriented transversely to the wind direction is proposed, in which the rotor is surrounded on all sides by collecting and deflecting vanes, each of which is set at an angle to the radial direction relative to the rotor in such a way that it guides the wind striking it onto one side of the rotor and shields the other side of the rotor.

If the axis of the rotor is arranged vertically, the device can accept wind from any direction without adjustment. The device can therefore be made with large dimensions and installed in multiples, one on top of another. Multi-story tower structures offering maximum output are possible.

In accordance with another embodiment of the invention, the rotor vanes are provided with openings which become larger as the wind velocity increases. The positions of the collecting and deflecting vanes can also change in a corresponding manner.

In addition to the conversion of wind energy into electrical energy, some of the variants of the inventive devices also pertain to the conversion of wind energy into mechanical energy, e.g., for the direct drive of water pumps.

BRIEF DESCRIPTION OF THE DRAWING

The drawings illustrate an exemplary embodiment of the invention:

FIGS. 5-14 show schematic diagrams of additional devices for using wind energy;

DETAILED DESCRIPTION OF THE INVENTION

Figure 1:
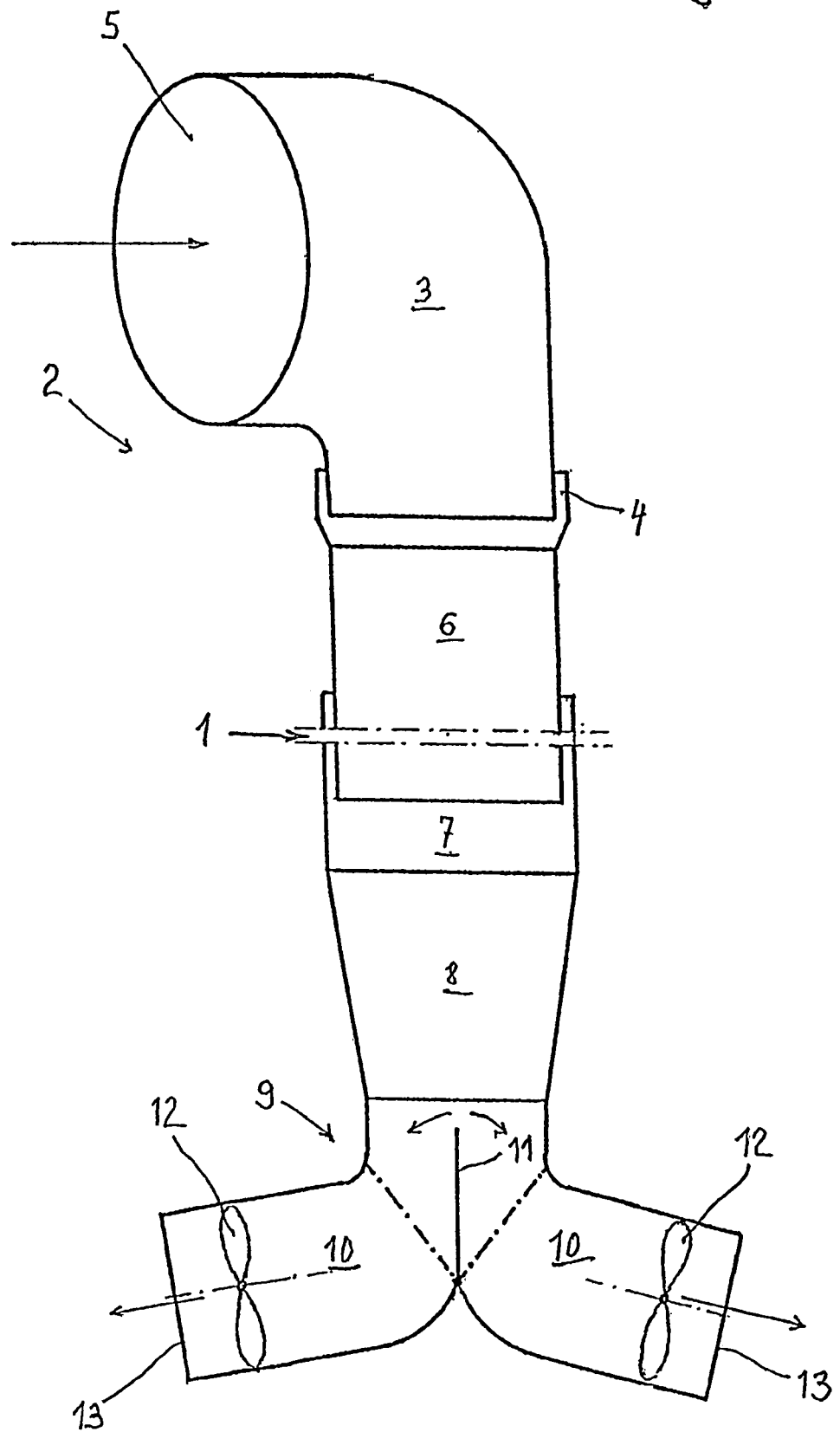
FIG. 1 shows a schematic front view of a device for using wind energy.
Figure 2:
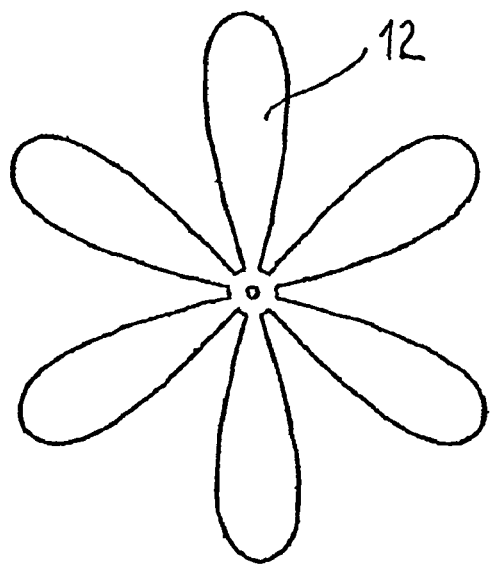
FIG. 2 shows a front view of a detail.

FIG. 1 shows a considerably shortened section of a tower 2, the removed portion being taken from the area marked 1, the static support at the base not being shown.

The top section 3 of the tower can rotate in a rotary bearing 4 around the vertical axis of the tower and is bent over to the side, so that its end, designed as a wind capture opening 5, lies in a vertical plane.

The tower section 6 underneath the rotary bearing 4 is designed in such a way that it can slide telescopically in and out of a stationary tower section 7. Beneath that is a tapered tower section 8, which branches at the bottom end into two channels 10. The two channels 10 can be closed as desired by a flap 11, arranged in the center, as indicated in dash-dot line. In the middle position illustrated in the figure, the flap 11 leaves the entrances to both channels 10 open.

The presence of a rotor 12 is indicated in each channel 10. Each rotor 12 drives a generator, installed outside the channel, possibly even underground.

Figure 3:
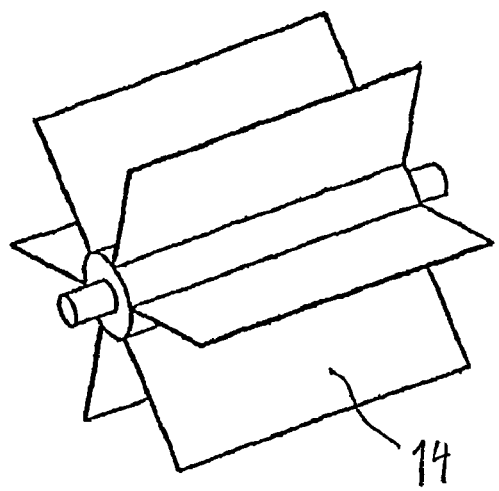
FIG. 3 shows an isometric projection of a detail of a different embodiment of a device for using wind energy.
Figure 4:
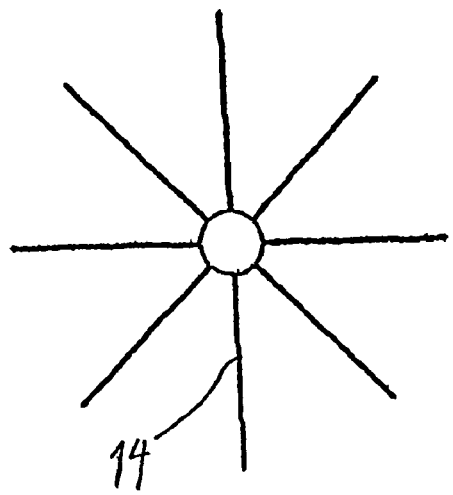
FIG. 4 shows an axial view of the detail in FIG. 3.

FIGS. 3 and 4 show different types of rotors 14. In contrast to the rotor 12, the rotor 14 is to be imagined projecting into the channel 10 from a well in the side of the channel 10. Outlets 13 at the ends of the channels 10 lead to the outside.

The way in which the device functions has already been described above.

FIG. 5 shows a windsock 15, set up on the ground.

It has a rectangular entrance 16 and is made by stretching material over a frame (not shown), which is anchored to the ground. The entrance leads to a section of reduced cross section. A bellows-like intermediate section 17 makes it possible to shift the entrance 16 when the wind turns so that it can face the wind again. The windsock leads (arrow 18) to a rotor; the exact configuration will depend on where the rotor/generator unit, for example, is installed. An alternative orientation is shown in broken line.

The wind-capturing entrance 16 does not have to be rectangular; it could also be oval or circular or of some other shape. The possibility can be provided of tilting the entrance 16 backward or of having it fold all the way back in strong winds. Additional deflecting walls (not shown) could be provided to guide the wind, especially at low wind velocities, toward the entrance 16.

FIG. 6 shows a system with a fan-like arrangement of wind scoops 19 pointing in all directions, which lead to a vertical flow channel 20. An arrow 21 shows the wind direction. The wind is captured by the four wind scoops 19 which are facing the wind. It then passes into the flow channel 20, which leads to a rotor/converter.

So that the air cannot escape through the other wind scoops 19, their openings are closed by a shield 22. In a weak wind, two collecting vanes 23, shown in broken line, could be set up. The shield 22 would then be shortened so that all of the wind scoops 19 subject to the effect of the collecting vanes 23 are open to the flow channel 20.

This system is intended for locations where the wind can come from any direction.

Figure 7:
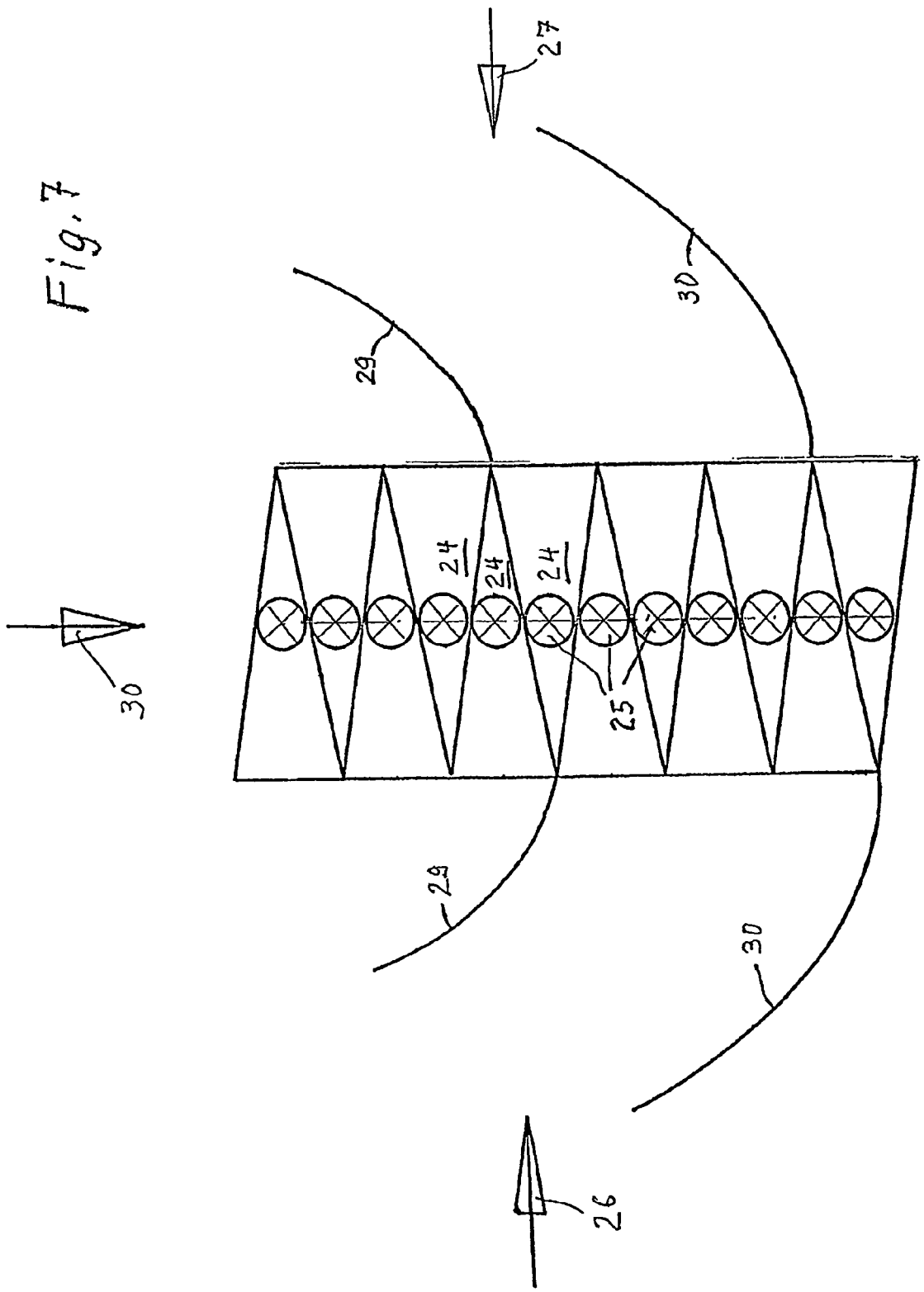

The system according to FIG. 7 is also intended for wind from various directions. It has wind scoops 24 with a triangular cross section, which are directed toward two sides. A flow channel 25 leads out from each one. Wind from the directions of arrows 26 and 27 is captured directly by the wind scoops 24. For wind from the direction according to the arrow 28, collecting vanes 29 and, behind them, even larger vanes 30 are provided. The system is suitable for installation on bridges or across valleys. The wind scoops 24 and the collecting vanes 29 and 30 can be made of sailcloth or the like. The collecting vanes can thus also be rolled up.

Figure 8:
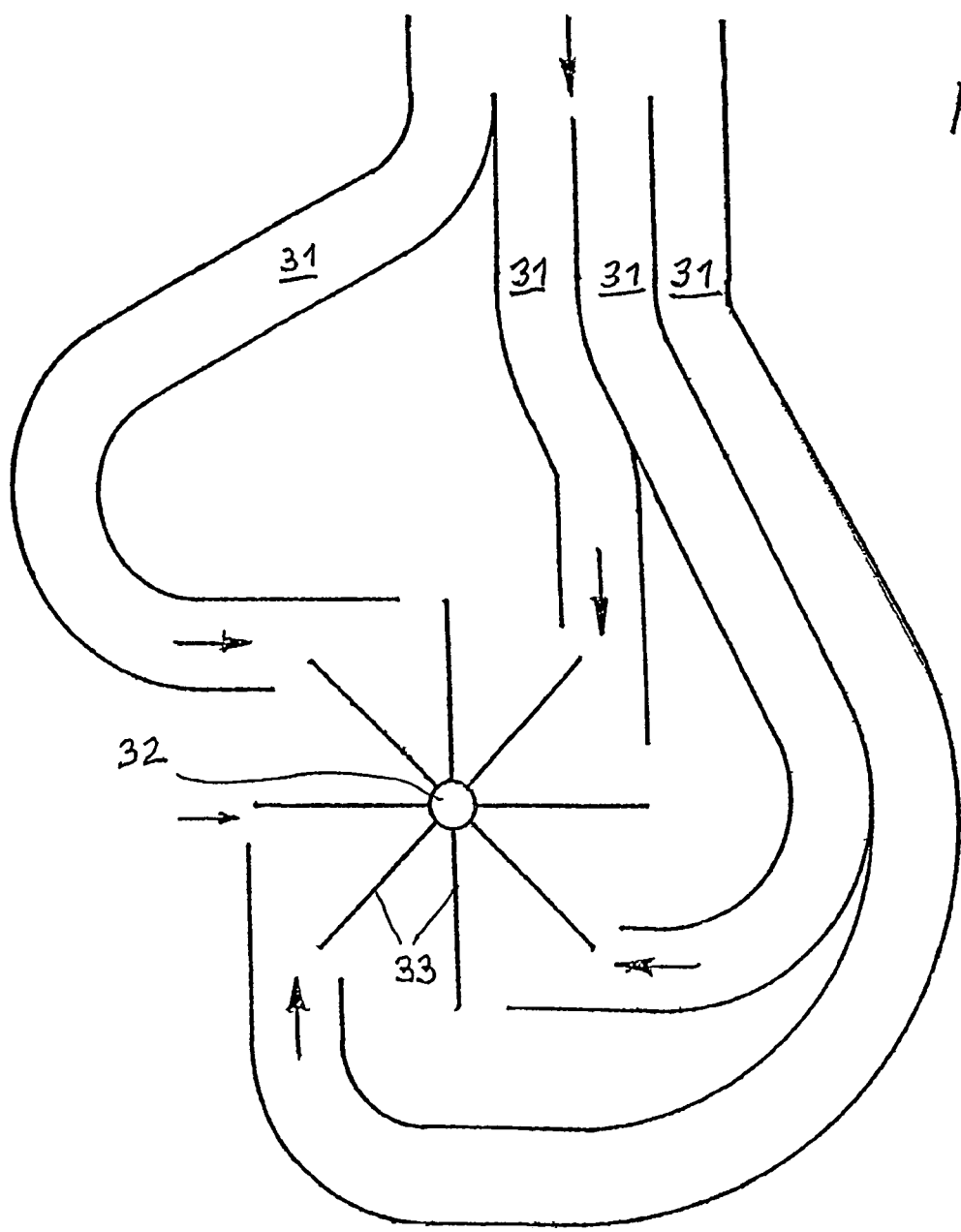

According to FIG. 8, several flow channels 31, which angle symmetrically away from each other, lead to a rotor 32. These could be the flow channels 25 according to FIG. 7, but they could also come from a single original flow channel, which is divided into several subchannels. The rotor vanes 33 shown are straight. Preferably, however, they are bent slightly against the flow and/or optimized in some other way.

Figure 9:
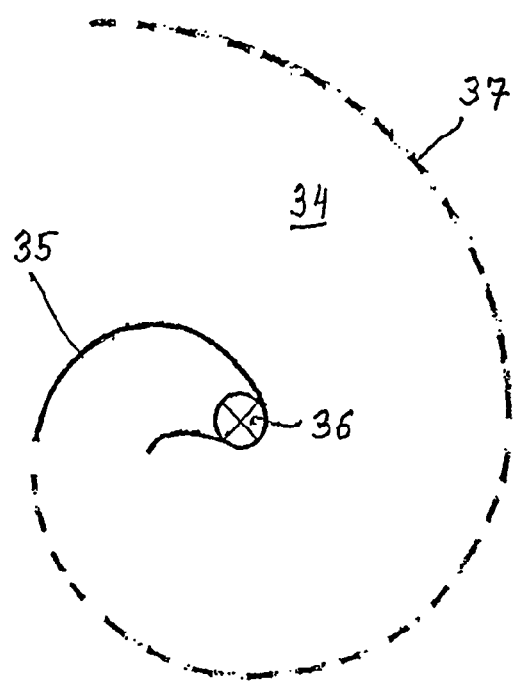

FIG. 9 shows a schematic diagram of a wind scoop 34 with the spiral shape of a snail shell. It consists of a fixed core part 35, from which a vertical flow channel 36 extends, and a deformable wall 37, shown in broken line, which can be bent into tighter or wider spirals so that the opening can be made to face wind coming from different directions.

Figure 10:
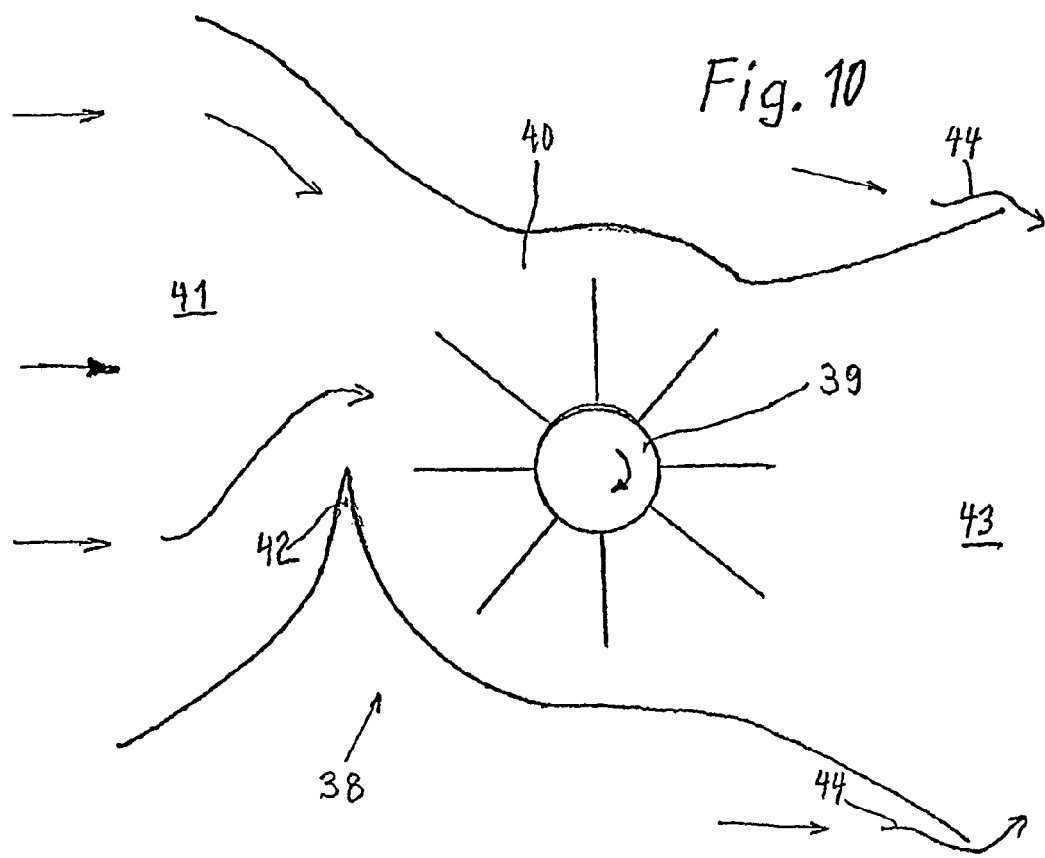

FIG. 10 shows a device 38, including its integrated rotor 39, which is set up in the wind and which turns with the wind. The rotor 39 is mounted in a short air conduit 40, which is designed as a collecting funnel 41 facing the wind. The conduit also has a necked-down section 42, which shields half of the rotor 39 from the flow. At the outlet 43, the air conduit 40 expands, so that the wind passing by around the outside of the air conduit 40, as indicated here by the arrows 44, exerts an increased suction effect.

Figure 11:
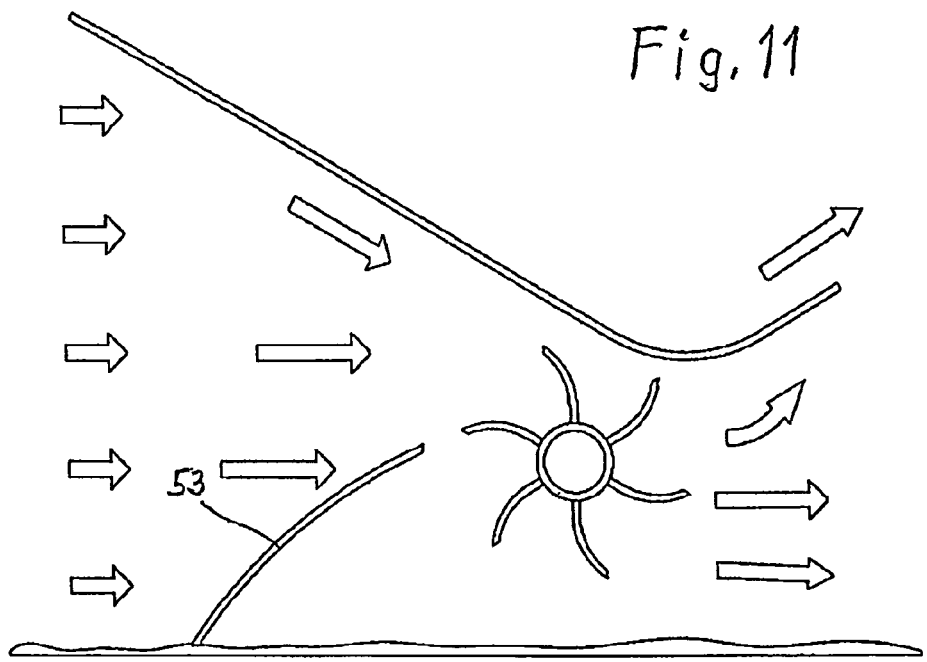

FIG. 11 shows a device which operates in approximately the same way. It is not intended as an independent device, however, but rather as a unit to be installed, for example, at the end of the windsock 15 according to FIG. 5. It stands on the ground; the axis of the rotor is horizontal. An internal fitting 53 shields half of the rotor and simultaneously diverts the wind onto to the other half.

FIG. 12 shows a rotor 54 set up directly in the wind and provided with a shield 55 on one side. There is no need for a more complete explanation. It should be made clear, however, that it is not the diverted wind which represents the effective flow here but rather, because of the elimination of the countertorque, it is the undiverted part of the wind of which use is made.

Figure 13:
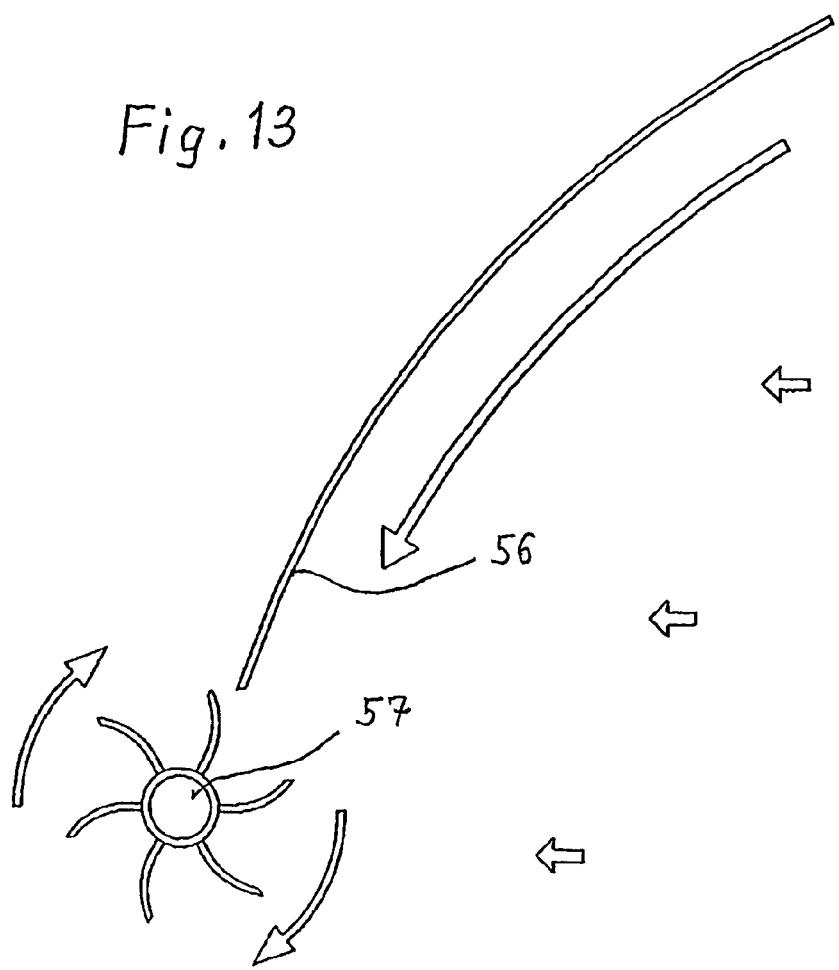

FIG. 13 shows a relatively large wind collecting and deflecting surface 56, which is brought up to the rotor 57 in such a way that it supplies the flow of air to half of the rotor and shields the other half. The collecting and deflecting surface 56 could be realized, for example, in the form of a masonry wall or by a sail. It could be installed in places where the wind blows essentially in only one direction, e.g., in specific valley locations. A sail could also extend down from above to a rotor with a horizontal axis.

Figure 14:
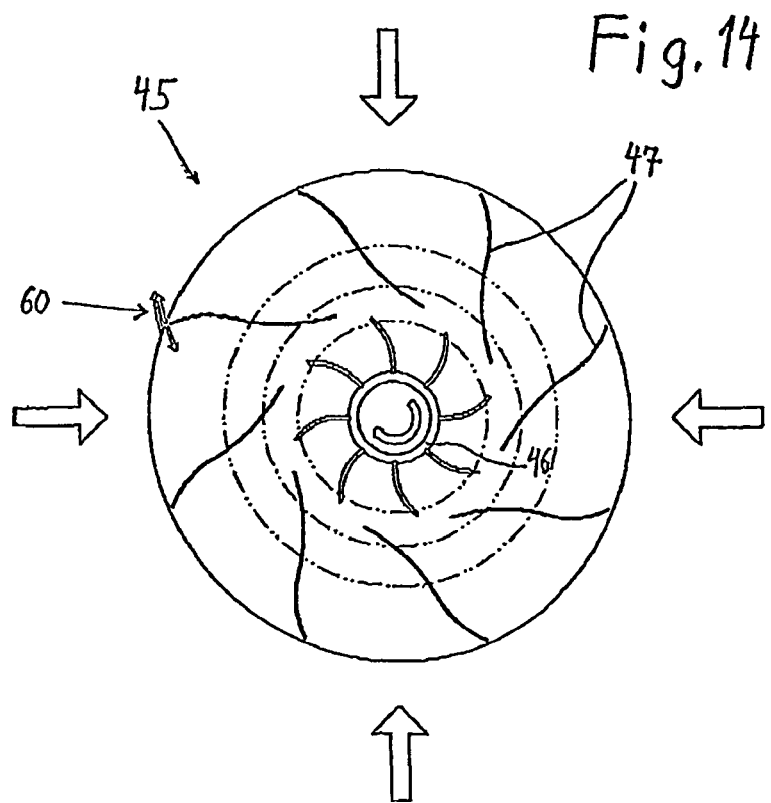

The overall system designated 45 in FIG. 14, like the device 38 according to FIG. 10, is set up in the wind. It can accept wind from any direction.

A rotor 46 is surrounded by collecting and deflecting vanes 47. Each collecting and deflecting vane 47 is set up at an angle to the radial direction so that it diverts the wind onto the rotor vanes on only one side of the rotor axis. The deflecting vanes are bent into a gentle S shape, so that they collect air more effectively on the outside and divert the air somewhat more to the side on the inside.

The vanes of the rotor 46 are bent slightly toward the wind.

On the downstream side of the rotor 46, the air exits between the collecting and deflecting vanes 47 on that side.

The device according to FIG. 14 is especially suitable for residential areas, e.g., on roofs.

The device is also especially suitable for being made as individual segments, which are arranged vertically. In other words, several of them can be stacked on top of each other. The system according to FIG. 10 can also consist of several stories. The segments or stories would each have a height of approximately 20 m, for example. Thus, a modular structure with the corresponding advantages with respect to production, transport, construction, and maintenance becomes possible. Smaller generator units can also be used.

The rotors 39 and 46 can have a hollow space in the center, which can be used for various purposes such as a storage room or machine room. The generators could also be installed here. In the case of the arrangements according to FIGS. 9 and 10, the generators can be installed in rotational areas located farther outward and thus operate without gears.

It is also possible to install several generators on each modular unit; the number of generators put on line would depend on the velocity of the wind.

The rotors 39 and 46 could be provided with flywheel masses to reduce the effect of brief fluctuations in the wind velocity on the voltage stability.

The collecting and deflecting vanes 47 can be mounted with freedom to pivot, as indicated at 60 in FIG. 14 by way of example, to increase the wind energy yield at low wind speeds or to reduce the supply of wind to the rotor, if necessary, such as during storms, or possibly to occupy a closed position to allow for repairs.

The collecting and deflecting vanes 47 could also be designed to telescope, so that their size can be increased.

Figure 15:
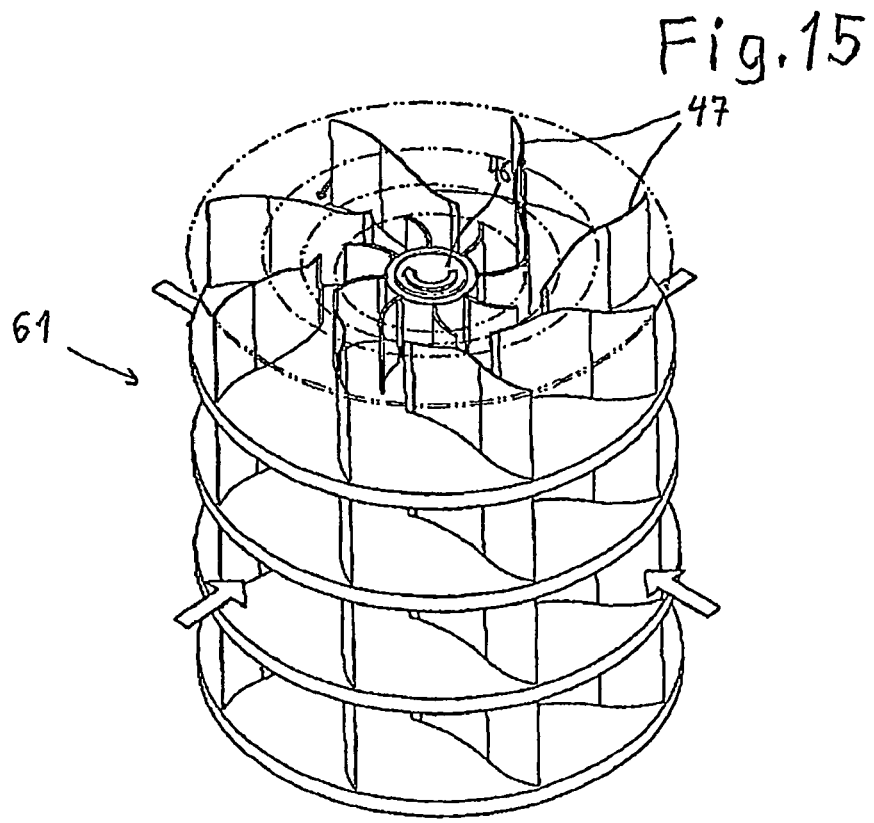
FIG. 15 shows an isometric projection of the device according to FIG. 14 in a multiple arrangement.

FIG. 15 shows the previously mentioned multi-story arrangement of the system 45 according to FIG. 14. The diagram is broken off above the fourth system. It would be possible to imagine a tower structure with an overall height similar to that of a power plant cooling tower.

Figure 16:
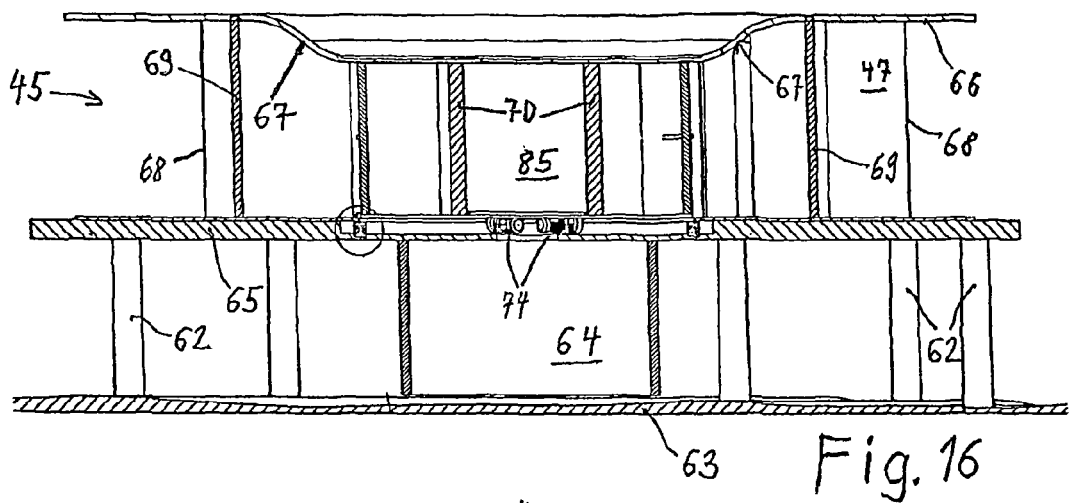
FIG. 16 shows a vertical cross section through the bottom section of the device according to FIG. 15.

FIG. 16 shows how the complete system, designated 61, can be constructed on the ground:

The lowermost system 45 is raised above the ground 63 on columns 62. In the center is a closed structure 64, through which the overall system 61 is accessible from below. In addition to stairs, elevators, etc., the structure 64 can accommodate offices, workshops, storage rooms, and the controls for the overall system. Stairs and/or elevators can be located more-or-less on the center vertical axis of the overall system.

Each system 45 has a foundation plate 65, on which the collecting and deflecting vanes 47 stand, and a thinner cover plate 66, supported by the vanes. The cover plate 66 is depressed at 67 toward the rotor 46 to accelerate the flow. The lines 68 are the outside edges of collecting and deflecting vanes 47; the narrow cross-sectional surfaces 69 are sections through the collecting and deflecting vanes 47. The two cross-sectional surfaces designated 70 pass through the wall of the hollow cylinder 85 forming the central body of the rotor. The other visible terminal edges and cross-sectional surfaces will not be discussed individually.

Figure 17:
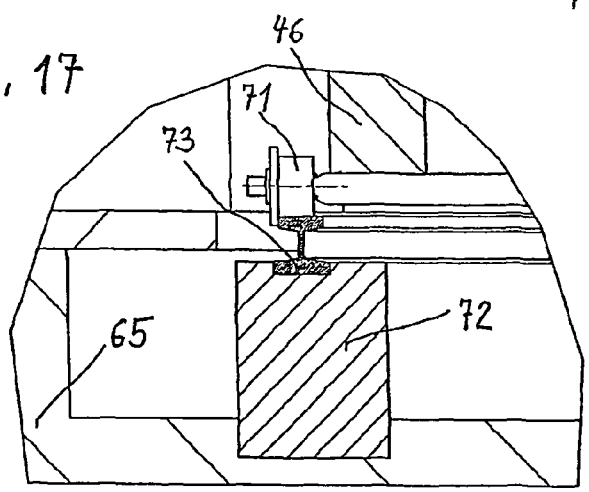
FIG. 17 shows a detail of FIG. 16 on a larger scale.

The rotor 46 (see the detail circled in FIG. 16 and shown on a larger scale in FIG. 17) is rotatably supported by rollers 71 on a circular rail 73, carried by a ring-shaped beam 72. The ring-shaped beam 72 is recessed into the foundation plate 65.

Figure 18:
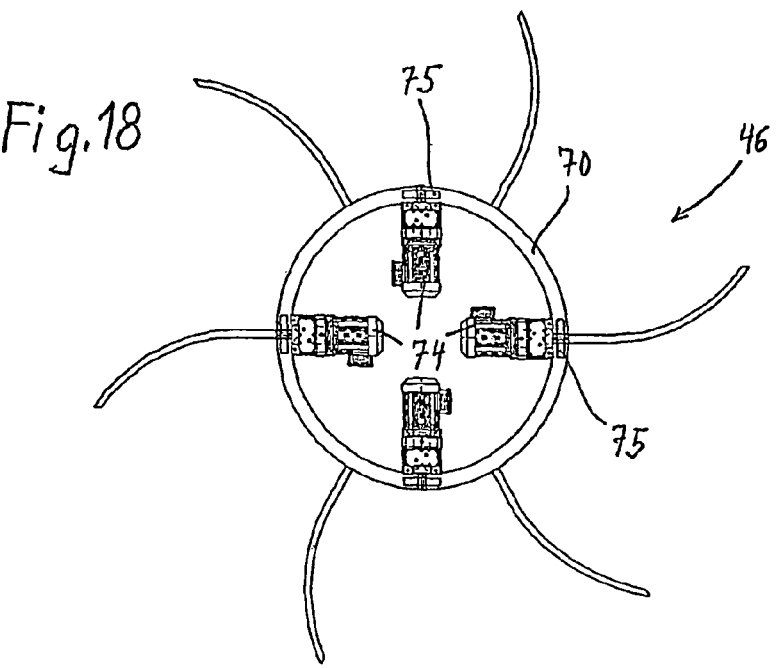
FIG. 18 shows a top view of another detail of the device according to FIG. 15.

Four generators 74, arranged symmetrically in a circle underneath the previously mentioned hollow cylinder, are, as illustrated in FIG. 18, driven by friction wheels or gear wheels 75, which rest on the bottom surface of the wall of the hollow cylinder 80. The arrangement 71-73 is not shown in FIG. 18.

Above the cover plate 66 appearing in FIG. 16 is the foundation plate 65 of the next system 45, comprising again all of the previously described parts 65-75, and so on.

Figure 19:
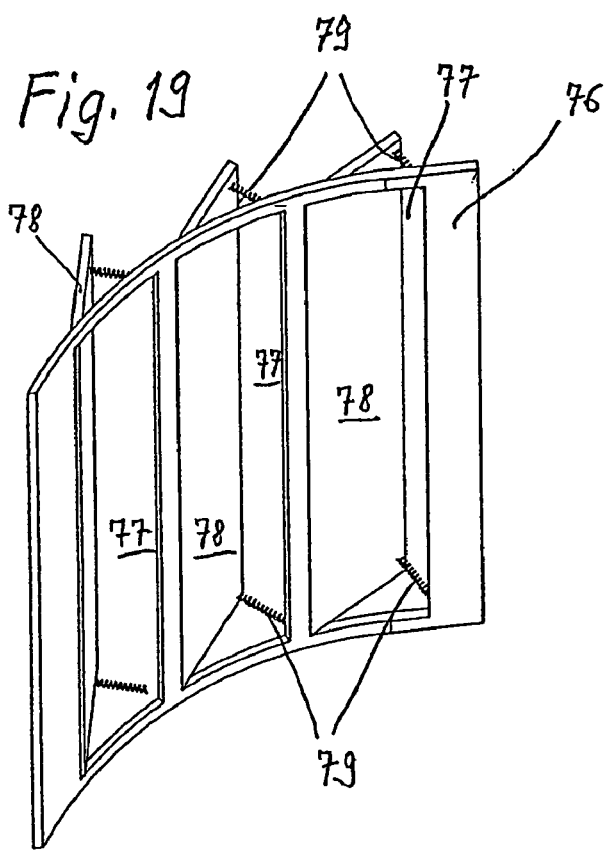
FIGS. 19 and 20 show isometric projections of modifications of rotor vanes.
Figure 20:
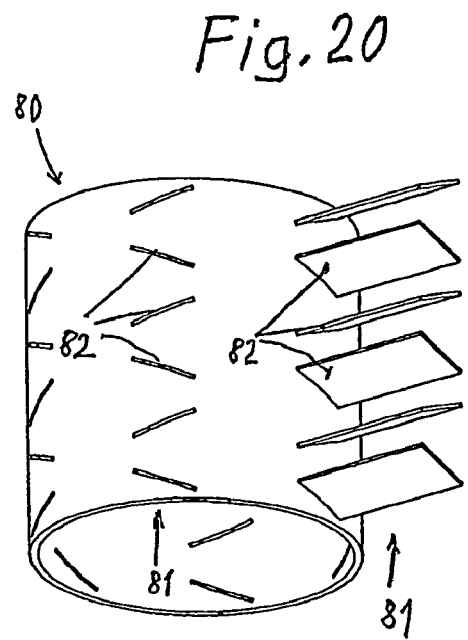

FIGS. 19 and 20 show variants of an elaboration of the invention, namely, variants in which the rotor vanes are provided with openings.

Three windows 77 are cut into the rotor vane 76 shown in FIG. 19, which is to be imagined as a vane of the rotor 46. These windows can be closed by flaps 78. The flaps 78 are held by springs 79 in such a way that they open more widely when the wind pressure increases. Even when the flaps 78 are closed there can still be an open gap, which allows a certain draft from the very beginning.

FIG. 20 shows a rotor 80 with rotor vanes 81, each of which is formed by a plurality of individual segments 82. The segments 82 are attached pivotably to the central body of the rotor 80 in such a way that they can be turned alternately in one direction or the other so that they can be moved from a position in which they are directly or almost directly next to each other and thus form a closed surface to a position in which they create free passages of greater or lesser size.

Figure 21:
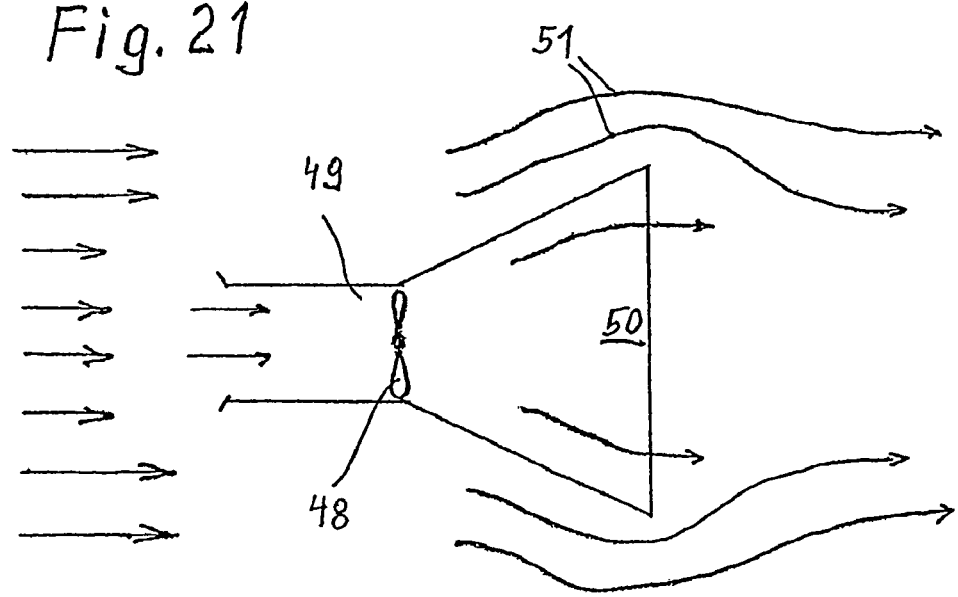
FIG. 21 illustrates the effective principle cited above under point (d).

FIG. 21 illustrates the suction effect. A rotor 48 is mounted in an air conduit 49, which does not expand in the direction facing the wind but rather toward the outlet 50. The expansion at the outlet 50 forces the passing air (arrows 51) to increase its velocity, which thus increases the suction effect according to the principle of the jet pump.

The different functional principles described above under points (a), (b), (c), and (d) are used in the systems and devices illustrated and described above as follows:

FIG. 1: (a) and (b);
FIG. 5: (a) and (b), possible embodiments according to (c) and (d);
FIG. 6: (a) and (b), possible embodiments according to (c) and (d);
FIG. 7: (a) and (b), possible embodiments according to (c) and (d);
FIG. 9: (a) and (b), possible embodiment according to (c);
FIG. 10: (b), (c), and (d);
FIG. 11: (b), (c), and (d);
FIG. 12: (c);
FIG. 13: (a) and (c);
FIG. 14, 15: (b) and (c), possibly to some extent (d); and
FIG. 21: (a).

The simplest way to realize functional principles (a) and (b) would be to set up a rotor in the lee of a house and to build a wall at an angle to the house to divert the wind to the rotor. In cooperation with an opposing wall of the house, the wind would be compressed at the same time.

In summary, the invention makes it possible to achieve the following in comparison with known systems:
- to increase the energy yield per unit volume or unit of useful area of the system;
- to recover energy in areas where this cannot be done with current systems, such as in residential areas or in areas of difficult topography;
- to recover wind energy at lower cost;
- to design energy systems for higher nominal power outputs; and
- to recover wind energy even at low and high wind speeds and/or to protect the systems more easily and more cheaply against storms, lightning strikes, etc.

The invention claimed is:

1. A device for using wind energy, comprising: a rotor for converting wind flow energy; at least one deflecting surface that diverts wind flow to the rotor, the rotor having a rotational axis transverse to a direction of wind flow, wherein the rotor is hollow along the rotational axis and is only mounted on a rail having a circular cross-section on which the rotor rotates for collecting and converting the wind flow energy; a stationary generator; and friction or gear wheels arranged to engage the rotor and drive the generator.

2. A device according to claim 1, wherein the rotor (46) is surrounded on all sides by collecting and deflecting vanes (47), each of which is set at an angle to the radial direction relative to the rotor (46) in such a way that it directs the wind striking it onto one side of the rotor (46) while shielding the other side of the rotor.

3. A device according to claim 2, comprising the arrangement (61) of multiple devices (45) one above the other.

* * * * *